(12) United States Patent
Watanabe et al.

(10) Patent No.: US 9,016,993 B2
(45) Date of Patent: Apr. 28, 2015

(54) GROMMET

(75) Inventors: Yasuhiro Watanabe, Toyota (JP); Michihiro Fukuo, Frankfurt (DE)

(73) Assignee: NIFCO Inc., Yokohama-shi, Kanagawa (JP)

(*) Notice: Subject to any disclaimer, the term of this patent is extended or adjusted under 35 U.S.C. 154(b) by 198 days.

(21) Appl. No.: 13/582,347

(22) PCT Filed: Mar. 1, 2011

(86) PCT No.: PCT/JP2011/054604
§ 371 (c)(1),
(2), (4) Date: Nov. 29, 2012

(87) PCT Pub. No.: WO2011/108531
PCT Pub. Date: Sep. 9, 2011

(65) Prior Publication Data
US 2013/0071201 A1    Mar. 21, 2013

(30) Foreign Application Priority Data
Mar. 3, 2010  (JP) .................... 2010-046316

(51) Int. Cl.
*F16B 19/10*    (2006.01)

(52) U.S. Cl.
CPC ............. *F16B 19/10* (2013.01); *F16B 19/1081* (2013.01)

(58) Field of Classification Search
USPC ......................................... 411/45–48, 32, 33
See application file for complete search history.

(56) References Cited

U.S. PATENT DOCUMENTS

| 4,674,930 | A | * | 6/1987 | Poe et al. ................ 411/40 |
| 4,726,722 | A | * | 2/1988 | Wollar ..................... 411/32 |
| 4,784,550 | A | * | 11/1988 | Wollar ..................... 411/32 |
| 5,286,152 | A | * | 2/1994 | Anderson ................ 411/45 |
| 5,375,954 | A | * | 12/1994 | Eguchi .................... 411/48 |
| 6,089,805 | A | * | 7/2000 | Salmon ................... 411/45 |
| 6,149,183 | A | * | 11/2000 | Ford ..................... 280/728.2 |
| 7,207,759 | B2 |  | 4/2007 | Kato |
| 8,662,807 | B2 | * | 3/2014 | Adachi .................... 411/45 |
| 2006/0198714 | A1 |  | 9/2006 | Lesecq |
| 2009/0110507 | A1 |  | 4/2009 | Katoh et al. |

FOREIGN PATENT DOCUMENTS

| CN | 1100184 | A | 3/1995 |
| CN | 1730953 | A | 2/2006 |
| CN | 1828071 | A | 9/2006 |
| CN | 101223367 | A | 7/2008 |
| CN | 101315093 | A | 12/2008 |
| JP | 1989-92508 | U | 6/1989 |
| JP | 1994-69417 | U | 9/1994 |
| JP | H10-030622 | A | 2/1998 |
| JP | 2005-188579 | A | 7/2005 |
| JP | 2006-046537 | A | 2/2006 |
| JP | 4201217 | B2 | 10/2008 |

OTHER PUBLICATIONS

China Patent Office, "Office action for CN 201180012030.9," Dec. 4, 2013.

* cited by examiner

*Primary Examiner* — Flemming Saether
(74) *Attorney, Agent, or Firm* — Manabu Kanesaka

(57) ABSTRACT

A grommet includes a shaft body, and a main body having a head and a leg spread by the shaft body pressed from a side of the head with elastic deformation. The shaft body includes a first contacting portion that contacts a contacted portion of the leg by pressing, and a second contacting portion located in a rear of the first contacting portion in the pressing direction, and a part of the leg is spread by the first contacting portion and then, another part of the leg is spread by further pressing the shaft body.

6 Claims, 12 Drawing Sheets

GROMMET

RELATED APPLICATIONS

The present application is National Phase of International Application No. PCT/JP2011/054604 filed Mar. 1, 2011, and claims priority from Japanese Application No. 2010-046316, filed Mar. 3, 2010.

TECHNICAL FIELD

The present invention relates to improvement in a grommet provided with a shaft body and a main body into which the shaft body is pressed.

BACKGROUND ART

There exists a grommet also called as a pin grommet constituted of a shaft body and a main body into which the shaft body is pressed. Such a grommet has a configuration in which the shaft body is pressed into the main body from a state where a leg of the main body is inserted into a through hole formed in a fixed object, thereby spreading the leg to fix the fixed object.

There is proposed a grommet in which its leg has two different spread points pressed by a pressing portion of a pin through insertion of the pin (shaft body) into the leg of the grommet (main body) (refer to Patent literature 1). In such a grommet, while the leg is being elastically deformed at the spread point on its front end side, the leg starts to be elastically deformed at the spread point on its bottom end side. Thus, the pressure resistance of the pin onto the grommet cannot be sufficiently reduced. FIG. 15 shows the concept. In FIG. 15, a horizontal axis represents a pin pressing stroke, and the stroke becomes larger toward the right. A vertical axis represents a pressure resistance. In FIG. 15, a dot-and-dash line shows a pressure resistance deemed to be caused by the leg having the spread point on its front end side, a broken line shows a pressure resistance deemed to be caused by the leg having the spread point on its bottom end side, and a solid line shows a combined resistance of the two resistances.

PRIOR ART DOCUMENT

Patent Literature

Patent literature 1: Japanese Patent No. 4201217

SUMMARY OF THE INVENTION

A main object of the present invention is to reduce a pressure resistance of a shaft body to a main body constituting a grommet as little as possible without impairing the function of the grommet.

To attain the object, according to the present invention, a grommet includes a shaft body, and a main body having a head and a leg spread by the shaft body pressed from a side of the head with elastic deformation, and the shaft body includes a first contacting portion that contacts a contacted portion of the leg by pressing, and a second contacting portion located in a rear of the first contacting portion in the pressing direction, and a part of the leg is spread by the first contacting portion and then, another part of the leg is spread by further pressing the shaft body.

In one preferred embodiment, the contacted portion is a protrusion that protrudes toward an inside of the leg, and the first contacting portion or the second contacting portion contacts the protrusion by pressing of the shaft body. In another preferred embodiment, both of the contacting portions are formed such that a formation area of the first contacting portion and a formation area of the second contacting portion in the shaft body are displaced from each other by a certain angle in a circumferential direction of the shaft body.

In the state where the first contacting portion of the shaft body is not in contact with the contacted portion, the leg is not elastically deformed. Subsequently, when the shaft body is pressed up to a position where the first contacting portion contacts the contacted portion, only a part of the leg is spread with elastic deformation. Then, another part of the leg is not elastically deformed until the part of the leg is completely spread. Then, when the shaft body is pressed up to a position where the second contacting portion contacts the contacted portion, another part of the leg is spread with elastic deformation. Thereby, the grommet holds the fixed object between the head and the leg to fix the fixed object. In such grommet, since the spreading of the part of the leg of the main body and the spreading of another part of the leg do not occur at the same time, the pressure resistance of the shaft body onto the main body can be suppressed below a certain value while spreading the part and another part of the leg together in a final fixed state.

By configuring the outer shape of a cross section of the leg of the main body so as to substantially conform to a circular arc of a virtual circle on an outer side of the leg, and substantially conform to sides of a virtual rectangle on an inner side of the leg, as compared to the case where the outer shape of the cross section is configured to conform to the circular arc of the virtual circle on both of the inner and outer sides, the leg can be spread by pressing of the shaft body more easily.

According to the present invention, the pressure resistance of the shaft body to the main body constituting the grommet can be reduced as little as possible without impairing the function of the grommet.

DETAILED DESCRIPTION OF PREFERRED EMBODIMENT

Figure 1:
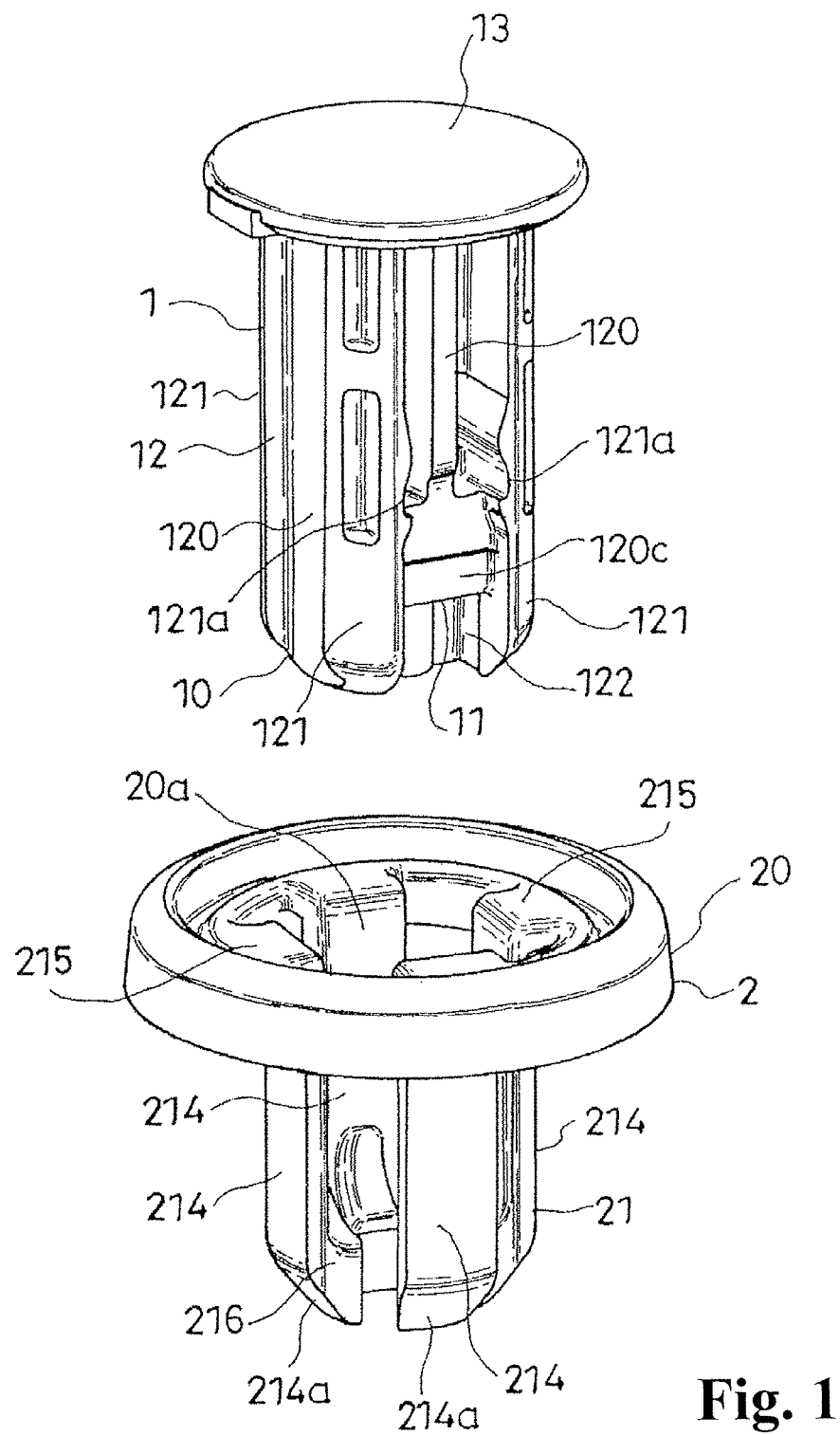
FIG. 1 is an exploded perspective view showing a grommet in accordance with an embodiment of the present invention.
Figure 2:
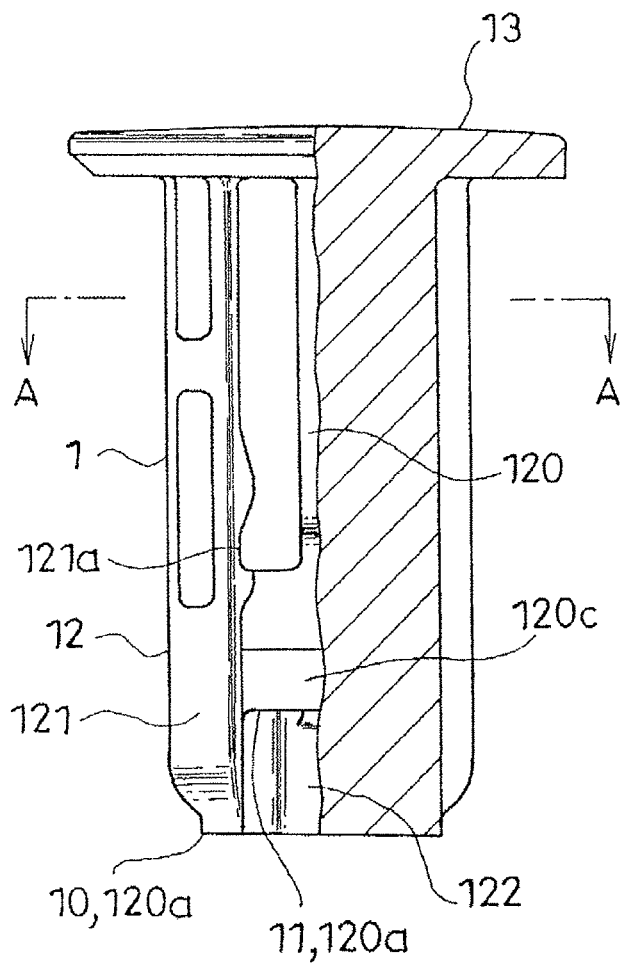
FIG. 2 is a partial sectional side view showing a shaft body constituting the grommet.
Figure 3:
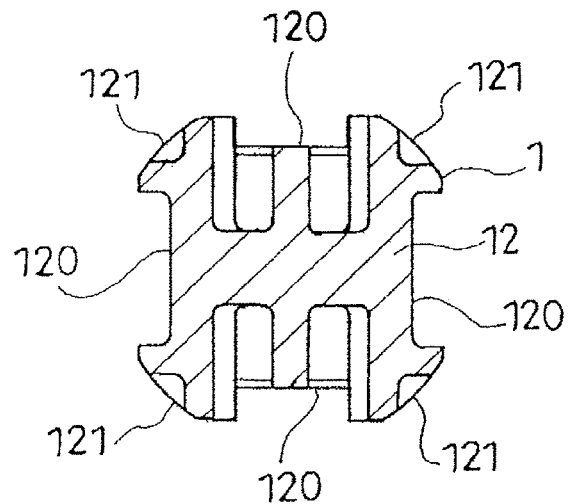
FIG. 3 is a sectional view showing the grommet taken along a line A-A in FIG. 2.
Figure 4:
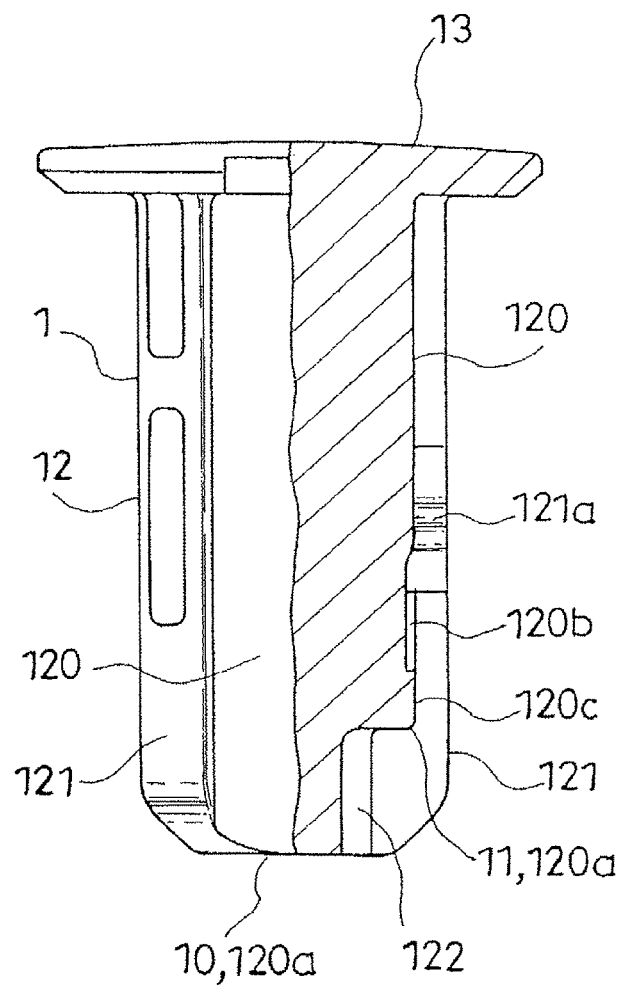
FIG. 4 is a partial sectional side view showing the shaft body constituting the grommet, and showing the shaft body when viewed in a direction displaced from that in FIG. 2 by 90 degrees.
Figure 5:
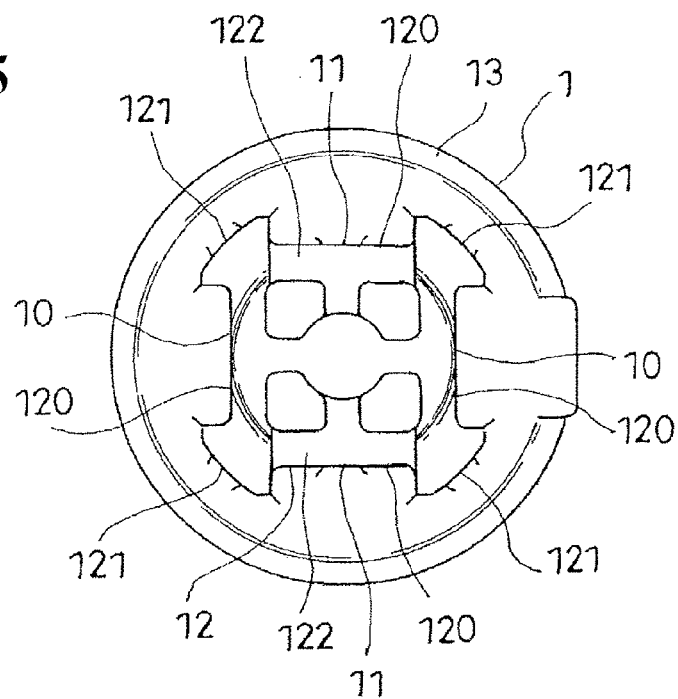
FIG. 5 is a bottom view showing the shaft body constituting the grommet.
Figure 6:
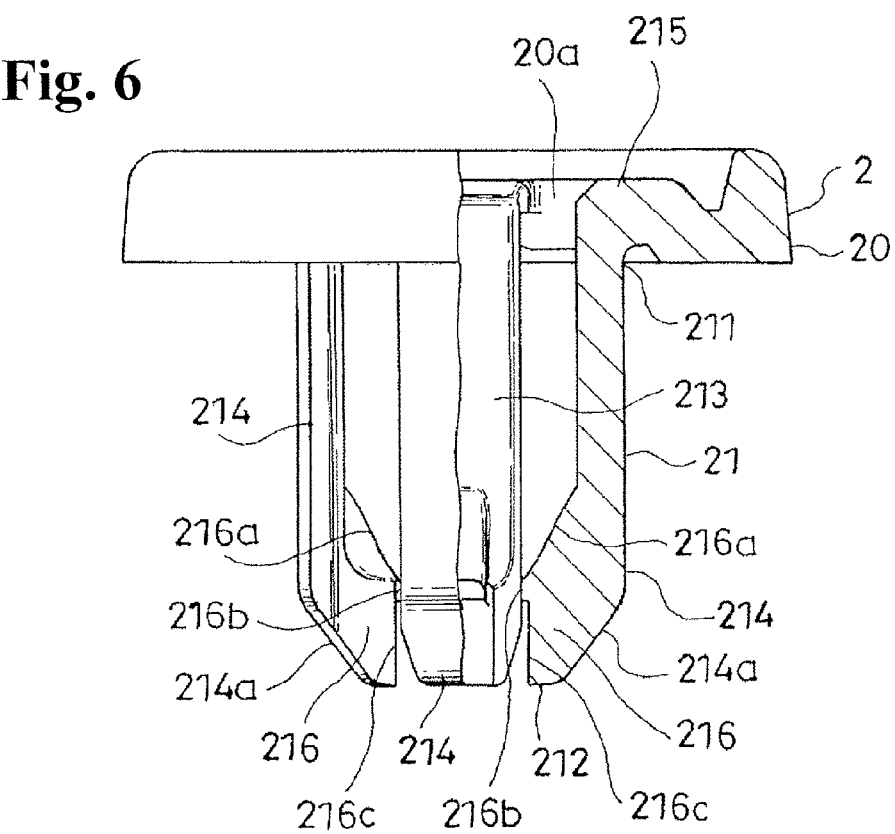
FIG. 6 is a partial sectional side view showing a main body constituting the grommet.

A typical embodiment of the present invention will be described below with reference to FIG. 1 to FIG. 14. The grommet in accordance with this embodiment comprises a shaft body 1 and a main body 2 into which the shaft body 1 is pressed, and the shaft body 1 is pressed into the main body 2 from a state where a leg 21 of the main body 2 is inserted into a through hole Pa formed in a fixed object P, thereby spreading the leg 21 to fix the fixed object P. Typically, such a grommet is used such that the leg 21 of the main body 2 is inserted into the through hole Pa in each of a plurality of fixed objects P from a state where the through holes Pa are overlapped so as to communicate with each other, thereby spreading the leg 21 to fix the plurality of fixed objects P via the grommet (FIGS. 13(a), 13(b)).

The main body 2 includes a head 20 and the leg 21 spread by the shaft body 1 pressed from the side of the head 20 with elastic deformation.

In an illustrated example, the head 20 is shaped like a disc having a larger outer diameter than the through hole Pa. The leg 21 has a thickness that can be inserted into the through hole Pa.

The leg 21 has a leg bottom 211 integrally communicating with one surface of the head 20, and protrudes in a direction orthogonal to the one surface. In the illustrated example, the head 20 has a circular receiving hole 20a for the shaft body 1. The leg 21 comprises four oblong plate-like elastic leg pieces 214, 214 . . . of the same size and shape, wherein each has wide inner and outer surfaces, and a receiving space 213 of the shaft body 1, which is surrounded by the four elastic leg pieces 214, 214 . . . , communicates with the receiving hole 20a. One end of each of the elastic leg pieces 214 integrally communicates with an edge of the receiving hole 20a and its bottom constitutes the leg bottom 211, and the other end constitutes a leg terminal 212 of the leg 21. The elastic leg pieces 214 are arranged at substantially regular intervals.

In the illustrated example, the one end of each elastic leg piece 214 integrally communicates with a protruding end of a communicating portion 215 that protrudes inward from the edge of the receiving hole 20a. The communicating portion 215 has the substantially same width as the elastic leg piece 214.

The other ends of the elastic leg pieces 214 respectively have a protrusion 216 that protrudes toward the inside of the leg 21. Due to the protrusion 216 of each of the elastic leg pieces 214, the receiving space 213 is narrowed on the side of the leg terminal 212 of the leg 21. The protrusion 216 includes an inclined surface 216a facing the head 20. A flat surface 216c in parallel to a center line of the leg 21 not shown in the figures exists between a top 216b of the protrusion 216 and the other end of each of the elastic leg pieces 214. An inclined guide surface 214a that gradually decreases an outer diameter of the leg 21 toward the other end of the elastic leg piece 214 is formed on the outer surface of each of the elastic leg pieces 214. The inclined guide surface 214a enables smooth insertion of the leg 21 of the main body 2 into the through hole Pa of the fixed object P.

Figure 7:
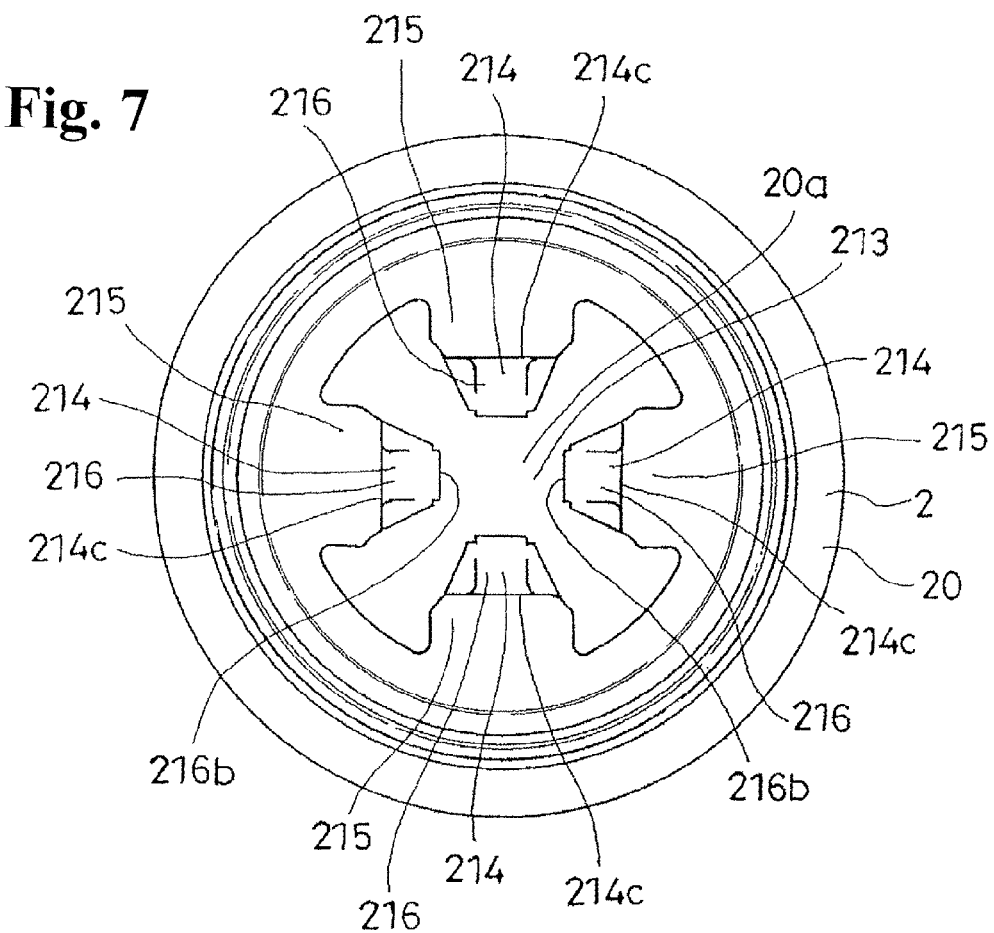
FIG. 7 is a plan view showing the main body constituting the grommet.
Figure 8:
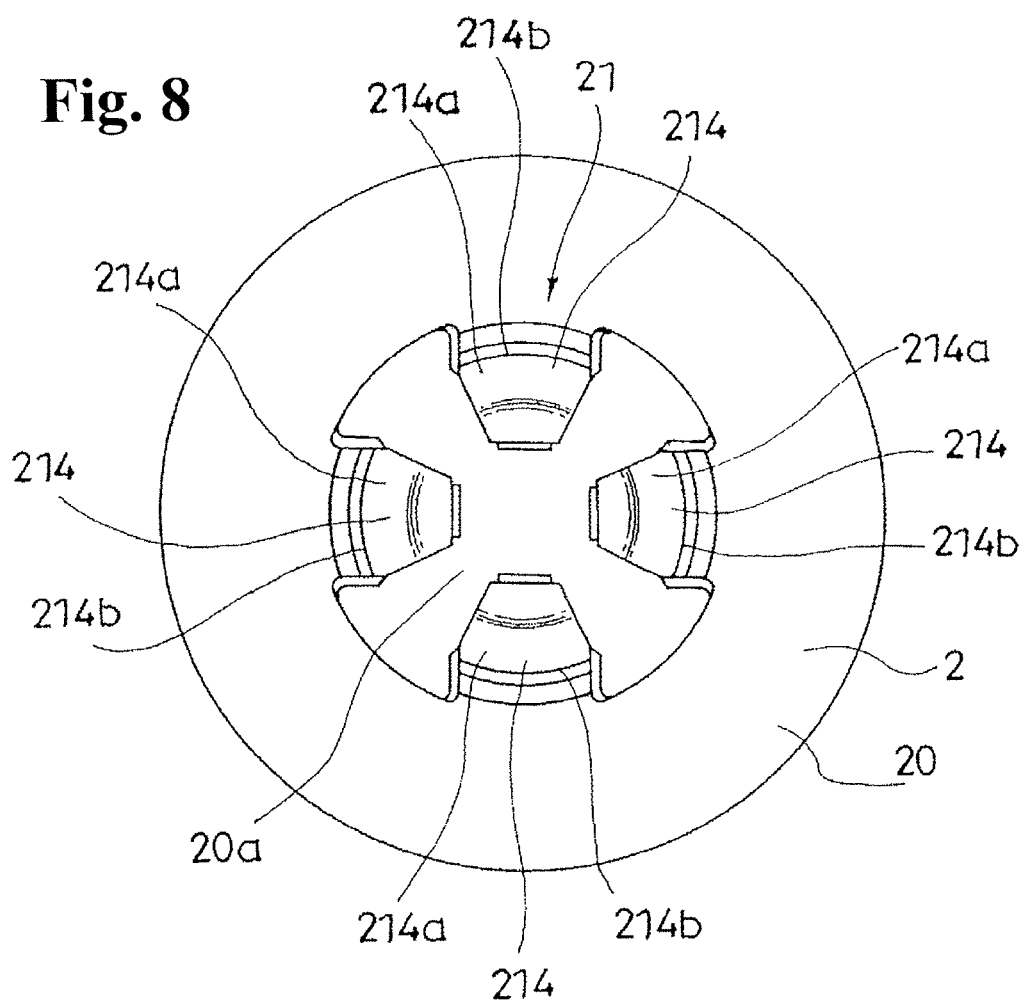
FIG. 8 is a bottom view showing the main body constituting the grommet.
Figure 10:
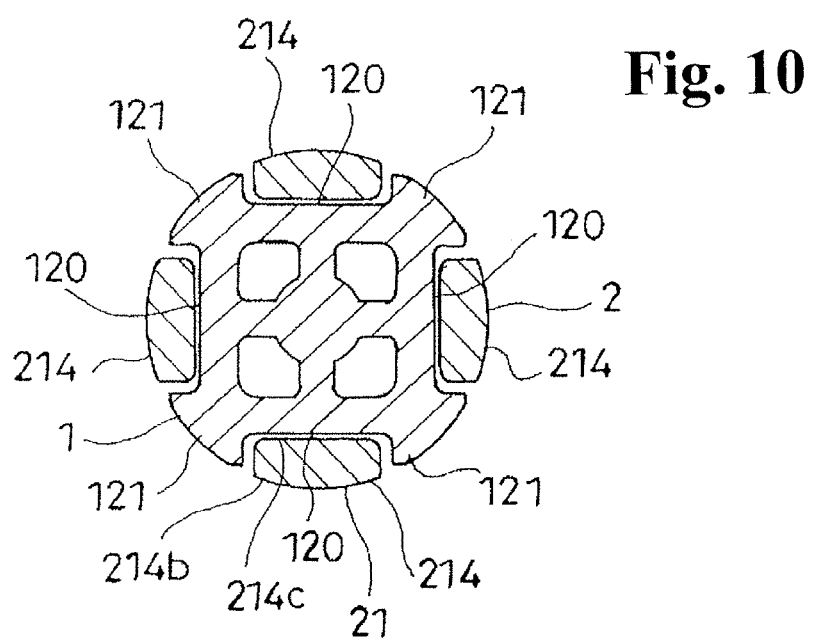
FIG. 10 is a horizontal sectional view showing the grommet in FIGS. 9(a), 9(b).
Figure 11A:
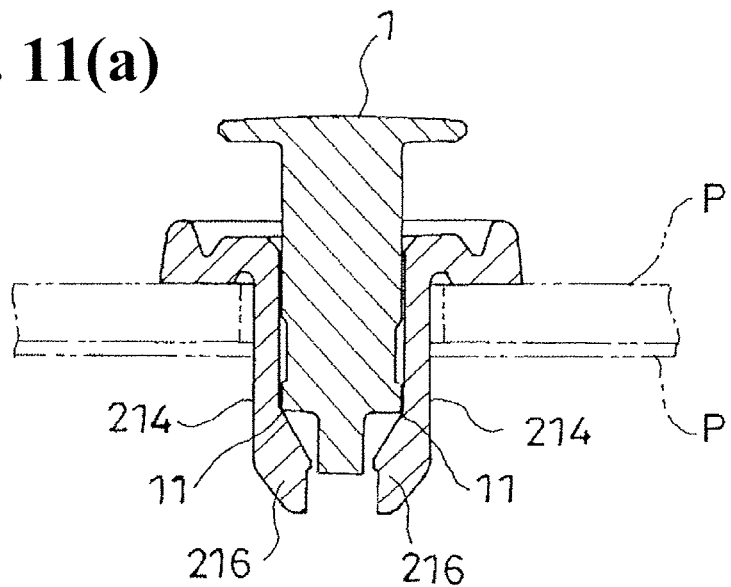
FIGS. 11(a) and 11(b) are sectional views showing a state where the shaft body starts to be pressed into the main body from the state in FIGS. 9(a), 9(b), and a cross-sectional position in FIG. 11(b) is displaced from a cross-sectional position in FIG. 11(a) by 90 degrees.
Figure 11B:
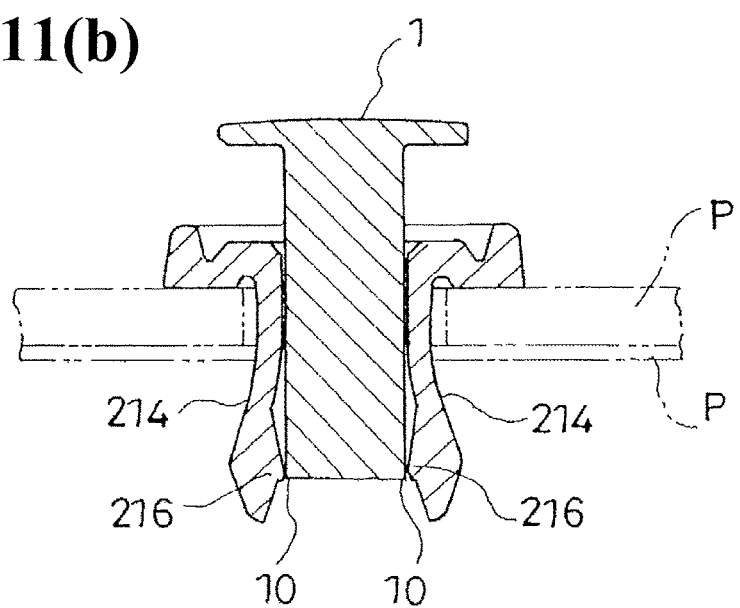
Figure 12A:
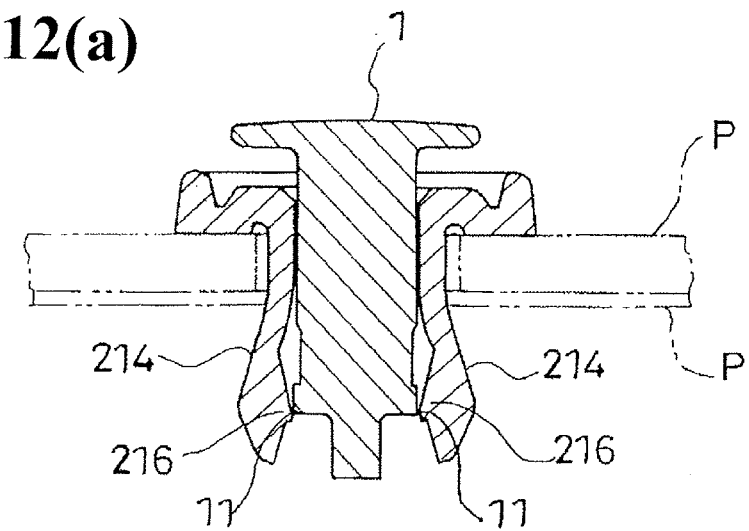
FIGS. 12(a) and 12(b) are sectional views showing a state where the shaft body is further pressed into the main body from the state in FIGS. 11(a), 11(b), and a cross-sectional position in FIG. 12(b) is displaced from a cross-sectional position in FIG. 12(a) by 90 degrees.
Figure 12B:
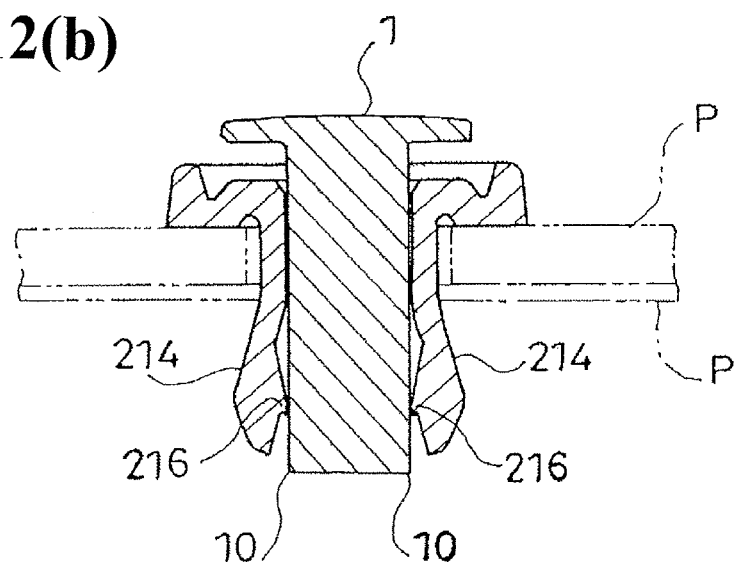

The outer shape of a cross section of the leg 21 substantially conforms to a circular arc of a virtual circle on the outer side of the leg 21, and substantially conforms to sides of a virtual rectangle on the inner side of the leg 21. That is, each of the elastic leg pieces 214 has a curved surface 214b conforming to the circular arc of the virtual circle as its outer surface, and has a flat surface 216c conforming to the sides of the virtual rectangle as its inner surface (FIG. 7, FIG. 8, FIG. 10). Thereby, in the example, as compared to the case where the outer shape of the cross section of the leg 21 substantially conforms to the circular arc of the virtual circle on both of the inner and outer sides of the leg 21, the leg 21 is spread more easily by pressing the shaft body 1 with elastic deformation.

When defining the protrusion 216 of the leg 21 as a contacted portion to be contacted by the pressing, the shaft body 1 includes a first contacting portion 10 that contacts the contacted portion, and a second contacting portion 11 located in the rear of the first contacting portion 10 in the pressing direction. By spreading a part of the leg 21 by the first contacting portion 10 and then, pressing the shaft body 1 thereinto, the second contacting portion 11 contacts the contacted portion, thereby spreading another part of the leg 21.

Figure 9A:
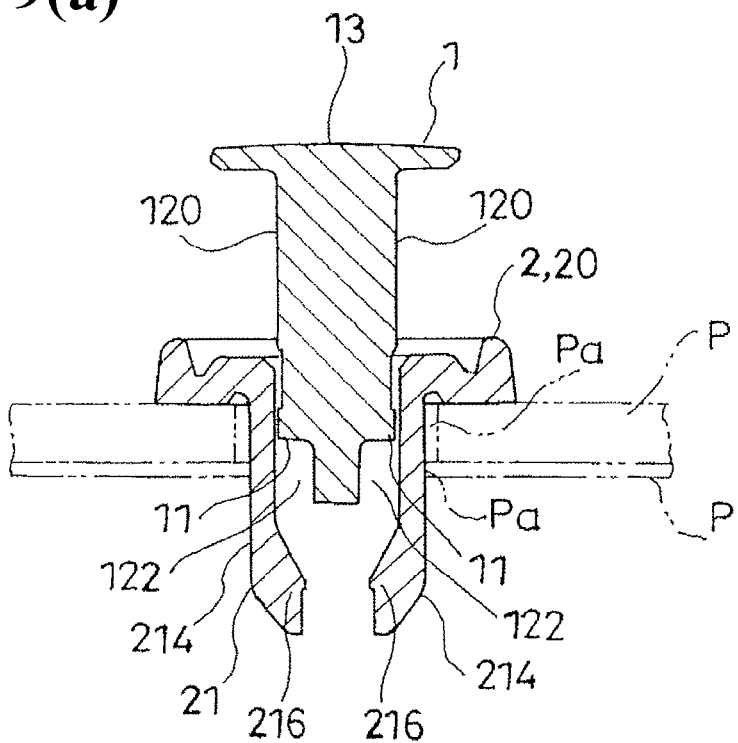
FIGS. 9(a) and 9(b) are sectional views showing a state where the main body constituting the grommet is inserted into a through hole of an object, and a cross-sectional position in FIG. 9(b) is displaced from a cross-sectional position in FIG. 9(a) by 90 degrees.
Figure 9B:
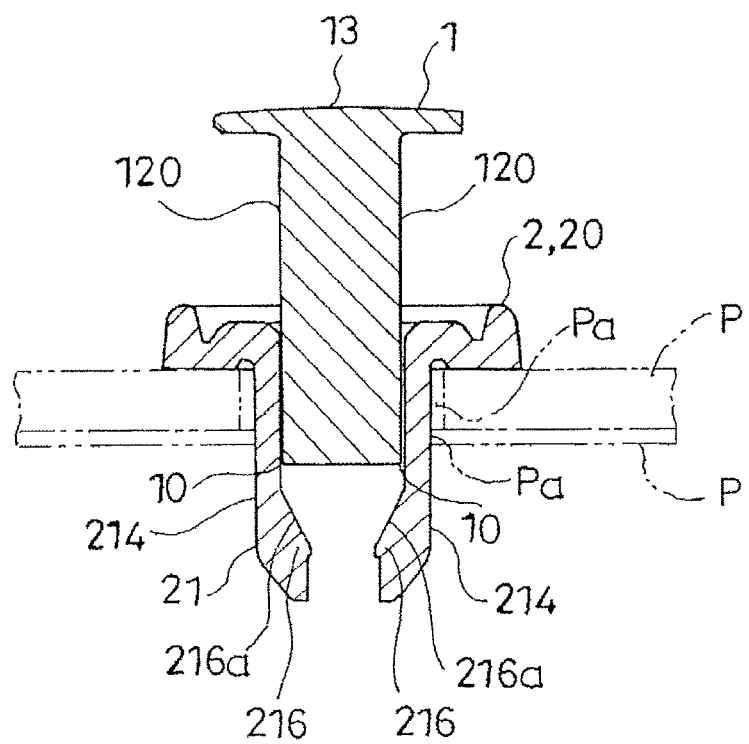

That is, in the state where the first contacting portion of the shaft body 1 is not in contact with the contacted portion, the leg 21 is not elastically deformed (FIGS. 9(a), 9(b)). Next, when the shaft body 1 is pressed up to a position where the first contacting portion 10 contacts the contacted portion, only a part of the leg 21 is spread with elastic deformation. In the illustrated example, at this time, among the four elastic leg pieces 214, 214 . . . constituting the leg 21, only the two elastic leg pieces 214 located back-to-back are bent outward (FIGS. 11(a), 11(b)). The remaining two elastic leg pieces 214 as another part of the leg 21 are not elastically deformed until the part of the leg 21 is completely spread. Then, when the shaft body 1 is pressed up to the position where the second contacting portion 11 contacts the contacted portion, the remaining two elastic leg pieces 214 as another part of the leg 21 are spread with elastic deformation (FIGS. 12(a), 12(b), FIGS. 13(a), 13(b)). Thereby, the grommet holds the fixed object P between the head 20 and the leg 21 to fix the fixed object P.

Figure 14:
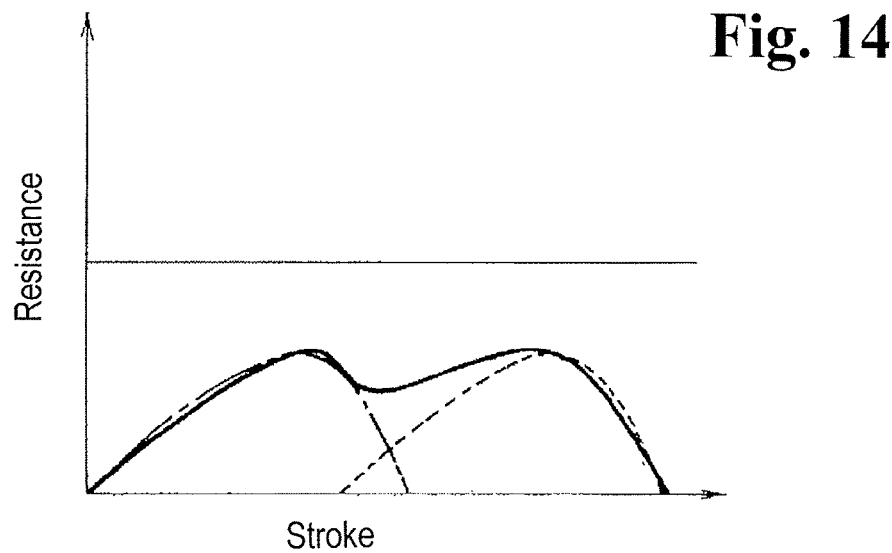
FIG. 14 is a conceptual view showing correlation between a pressing stroke of the shaft body and a pressure resistance in the grommet according to the present invention.
Figure 15:
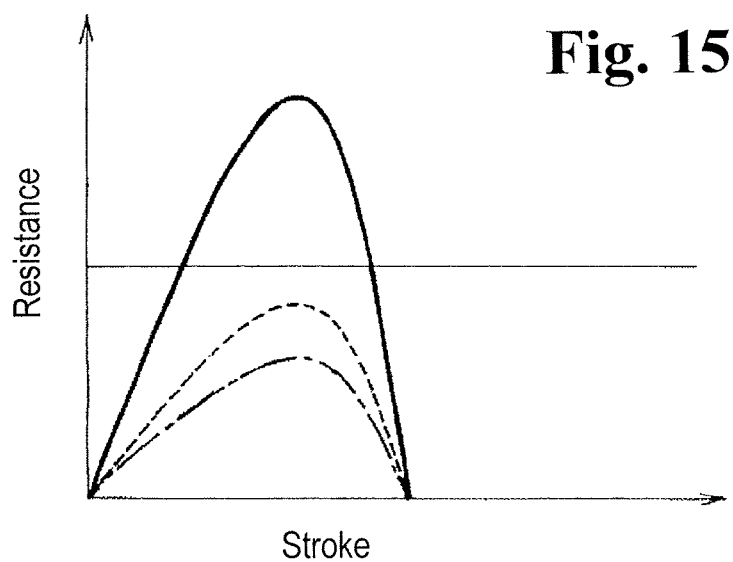
FIG. 15 is a conceptual view showing correlation between a pressing stroke of the shaft body and a pressure resistance in a conventional grommet.

In the grommet in this embodiment, since the spreading of a part of the leg 21 of the main body 2 and the spreading of another part of the leg 21 do not occur at the same time, the pressure resistance of the shaft body 1 to the main body 2 can be suppressed below a certain value while spreading the part and another part of the leg 21 together in a final fixed state. FIG. 14 shows the concept. In FIG. 14, a horizontal axis represents a pressing stroke of the shaft body 1, and the stroke becomes larger toward the right. A vertical axis represents pressure resistances. In FIG. 14, a dot-and-dash line shows a pressure resistance deemed to be caused by the part of the leg 21 of the main body 2, a broken line shows a pressure resistance deemed to be caused by the another part of the leg 21 of the main body 2, and a solid line shows a combined resistance of the two resistances.

Specifically, the shaft body 1 includes a main body portion 12 substantially shaped like a rectangular column and a disc portion 13. One end of the main body portion 12 integrally communicates with one surface of the disc portion 13. The main body portion 12 has a thickness that can be inserted into the receiving space 213 of the leg 21 through the receiving hole 20a of the main body 2. The disc portion 13 has a larger outer diameter than the thickness of the main body portion 12, such that the shaft body 1 can be pressed into the main body 2 up to a position where the disc portion 13 contacts the other surface of the head 20 of the main body 2. The receiving hole 20a is blocked by the disc portion 13 at a position where the shaft body 1 is completely pressed into the main body 2.

At each point of the main body portion 12, the shape of a cross section of the main body portion 12 of the shaft body 1 substantially conforms to a virtual rectangle. That is, the main body portion 12 of the shaft body 1 includes four side surfaces 120, 120 . . . . In the illustrated example, a corner 121 between the adjacent side surfaces 120 is shaped like a rib extending in an axial direction of the shaft body 1, and each of the side surfaces 120 is shaped like a groove between the right and left corners 121. A distance between the right and left corners 121 substantially corresponds to the width of the elastic leg piece 214. In the illustrated example, the shaft body 1 is inserted into the receiving space 213 from the side of its other end through the receiving hole 20a in the state where the elastic leg pieces 214 are respectively stored in the right and left corners 121 surrounding one side surface 120. A distance between the two side surfaces 120, 120 located back-to-back in the shaft body 1 substantially corresponds to a distance between inner surfaces configured as the flat surfaces 214c of the two opposed elastic leg pieces 214, 214 of the leg 21 of the main body 2.

On the side of the other end as the front end in the pressing direction of the main body portion 12 of the shaft body 1, recesses 122 are formed wherein each is formed between the adjacent corners 121 so as to be opened outward at the other end of the shaft body 1 and retract a terminal 120a of the side surface 120 rearward in the pressing direction further than the other end of the main body portion 12. In the illustrated example, the recesses 122 of the two side surfaces 120 located back-to-back among the four side surfaces 120, 120 . . . of the main body portion 12 retract the terminal 120a rearward in the pressing direction of the shaft body 1. That is, the main body portion 12 has the recesses 122 located back-to-back. A distance between the bottom surfaces of the recesses 122, 122 at the two locations is smaller than the distance between the protrusions 216 of the two opposed elastic leg pieces 214 constituting the leg 21 of the main body 2.

That is, in this embodiment, the terminal 120a of the side surfaces 120, which is retracted by the recesses 122, constitutes the second contacting portion 11, and the terminal 120a of the remaining side surfaces 120 constitutes the first contacting portion 10. Thus, in this embodiment, a formation area of the first contacting portion 10 and a formation area of the second contacting portion 11 in the shaft body 1 are displaced from each other by a certain angle in a circumferential direction of the shaft body 1. In the illustrated example, the second contacting portion 11 is displaced from the first contacting portion 10 by 90 degrees.

Figure 13A:
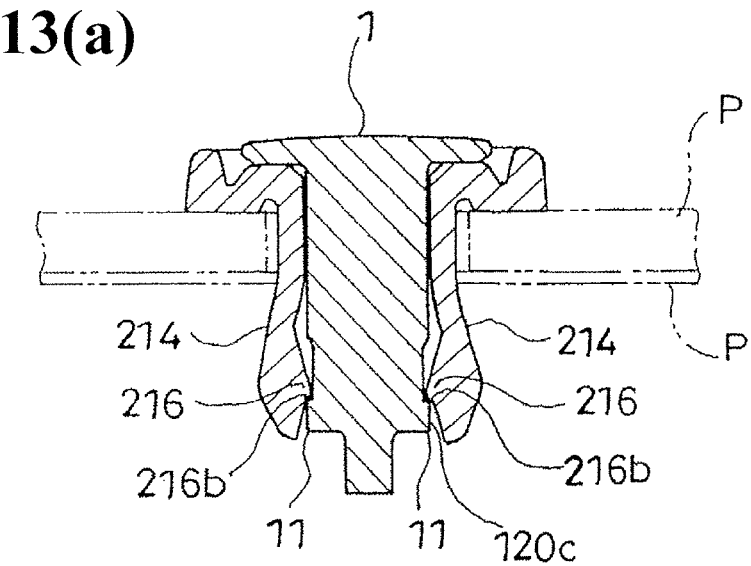
FIGS. 13(a) and 13(b) are sectional views showing a state where the shaft body is completely pressed into the main body, and a cross-sectional position in FIG. 13(b) is displaced from a cross-sectional position in FIG. 13(a) by 90 degrees.
Figure 13B:
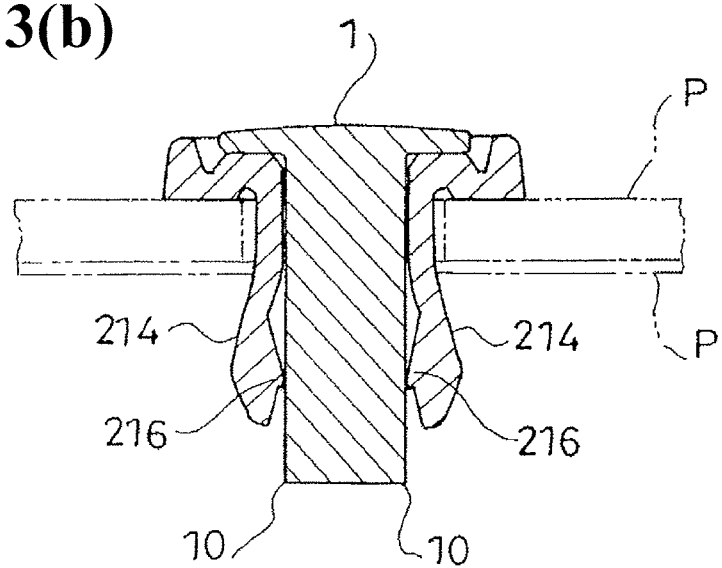

In this embodiment, a portion closer to the terminal than an intermediate portion 120b of the side surface 120, the terminal 120a of which is retracted by the recess 122, is extended outward as an engaging portion 120c, and the elastic leg pieces 214 that contact the protrusions 216 of the second contacting portions 11 and are spread, are slightly bent back at positions where the tops 216b of the protrusions 216 exceed the terminal, and the tops 216b are hooked at the engaging portions 120c (FIGS. 13(a), 13(b)).

In this embodiment, a recess 121a recessed from the side of the side surface 120 is formed at each position closer to the disc portion 13 than the second contacting portion 11 in the right and left corners 121 interposing the side surface 120, the terminal of which is retracted by the recess 122, therebetween, and a part of the shaft body 1 is inserted into the main body 2 up to a position when an edge of the communicating portion 215 enters into the recess 121a. Thereby, in the state where the first contacting portion 10 is not in contact with the protrusion 216, the main body 2 can be temporarily engaged with the shaft body 1. When the shaft body 1 is pressed from this temporary engaged state, the edge of the communicating portion 215 escapes from the recess 121a allowing the pressing of the shaft body 1.

The elastic deformation characteristics can be easily imparted to the areas that should have the characteristics in the above-mentioned grommet by making the whole or a part of the grommet from synthetic resin.

Specification, Claims, figures and Abstract of Japanese Patent Application No. 2010-046316 filed on Mar. 3, 2010 are wholly cited herein, and are incorporated as Disclosure of Specification of the present invention.

The invention claimed is:

1. A grommet comprising:
    a shaft body including a first side surface having a first contacting portion at a distal end thereof, a second side surface having a second contacting portion retracting from the first contacting portion, and a recess extending from the first contacting portion to the second contacting portion; and
    a main body including a head, and a plurality of legs extending downward from the head and defining a receiving hole therein, the legs having contacted portions and being spread, with elastic deformation, by the shaft body when the shaft body is pressed into the receiving hole from the head;
    wherein when the shaft body is pressed into the receiving hole, the leg corresponding to the first side surface is spread by the first contacting portion and thereafter, the leg corresponding to the second side surface is spread by the second contacting portion by further pressing the shaft body,
    the first contacting portion and the second contacting portion in the shaft body are displaced from each other by a predetermined angle in a circumferential direction of the shaft body, and
    the first contacting portion and the second contacting portion in the shaft body are displaced from each other by 90 degrees in the circumferential direction of the shaft body.

2. The grommet according to claim 1, wherein each of the first and second contacted portions is a protrusion that protrudes from an inside face of the leg, and the first contacting portion or the second contacting portion contacts the protrusion by pressing the shaft body.

3. The grommet according to claim 2, wherein a shape of a cross section of the legs of the main body substantially conforms to a circular arc of a virtual circle on an outer side of the legs, and substantially conforms to a virtual rectangle on an inner side of the legs.

4. The grommet according to claim 1, wherein a shape of a cross section of the legs of the main body substantially conforms to a circular arc of a virtual circle on an outer side of the legs, and substantially conforms to a virtual rectangle on an inner side of the legs.

5. A grommet comprising:

a shaft body including a first side surface having a first contacting portion at a distal end thereof, a second side surface having a second contacting portion retracting from the first contacting portion, and a recess extending from the first contacting portion to the second contacting portion; and a main body including a head, and a plurality of legs extending downward from the head and defining a receiving hole therein, the legs having contacted portions and being spread, with elastic deformation, by the shaft body when the shaft body is pressed into the receiving hole from the head;

wherein when the shaft body is pressed into the receiving hole, the leg corresponding to the first side surface is spread by the first contacting portion and thereafter, the leg corresponding to the second side surface is spread by the second contacting portion by further pressing the shaft body, the first contacting portion and the second contacting portion in the shaft body are displaced from each other by a predetermined angle in a circumferential direction of the shaft body, and the shaft body includes a top, two of the first side surfaces extending downwardly from the top and facing outwardly, each having the first contacting portion at a distal end thereof, and two of the second side surfaces extending downward from the top and located between the two of the first side surfaces to face outwardly, each having the second contacting portion retracted from the first contacting portion.

6. The grommet according to claim 5, wherein each of the first side surfaces has corners extending from the top and a groove between the corners, and each of the second side surfaces has a first portion directly contacting rear sides of the first side surfaces and a second portion extending from the top to the first portion without contacting the rear sides of the first side surfaces.

* * * * *